March 22, 1927.

A. BARBIER 1,622,217

SPEED REDUCING APPARATUS

Filed Feb. 16, 1926    2 Sheets-Sheet 1

Inventor
A. Barbier

Patented Mar. 22, 1927.

1,622,217

UNITED STATES PATENT OFFICE.

ALFRED BARBIER, OF COURCELLES, BELGIUM.

SPEED-REDUCING APPARATUS.

Application filed February 16, 1926, Serial No. 88,616, and in Belgium February 19, 1925.

My invention relates to a speed reducing apparatus adapted to be mounted between a driving shaft and a driven member in all cases when the resisting couple of the member to be driven varies, and when the speed can vary.

This apparatus can be used as a transmission gear at variable speeds for motor cars, for driving lifting apparatus or engines such as shearing, punching and other similar machines.

One object of my invention is to provide an apparatus having the following properties:

(1) The maximum driving couple which can be transmitted to the driving shaft increases with the angular speed of this shaft.

(2) For a given speed of the driving shaft the resisting maximum couple measured on the driven member increases when the speed of this member decreases.

(3) If a given power is transmitted to the driving shaft, the driven member is driven, whatever may be the resisting couple and the speed of this member varies in an inversed ratio with the resisting couple.

(4) If the resisting couple, measured on the member to be driven is invariable, whatever the driving power may be, the speed of the driven member being in this case in a direct ratio with the driving power.

With these objects in view, my invention consists in the special arrangements and combinations of parts as hereinafter fully described and pointed out in the appended claims.

Referring to the annexed drawing, which shows as an example the embodiment of my invention.

Figure 1:
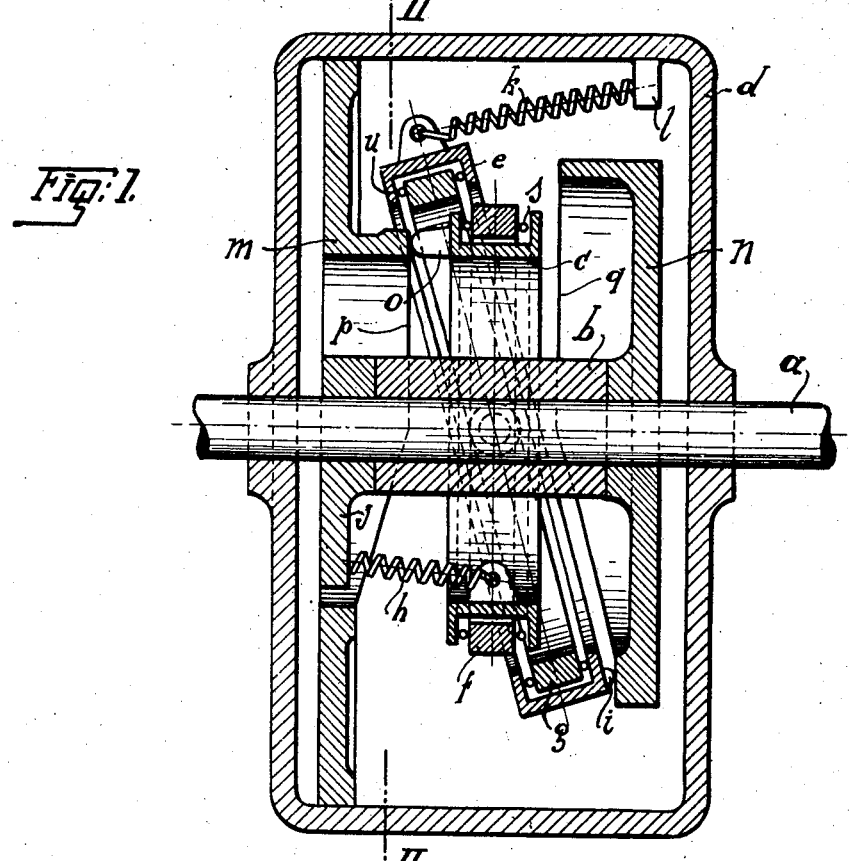
Fig. 1 is a longitudinal cross section of the apparatus taken on line I—I in Fig. 2.
Figure 3:
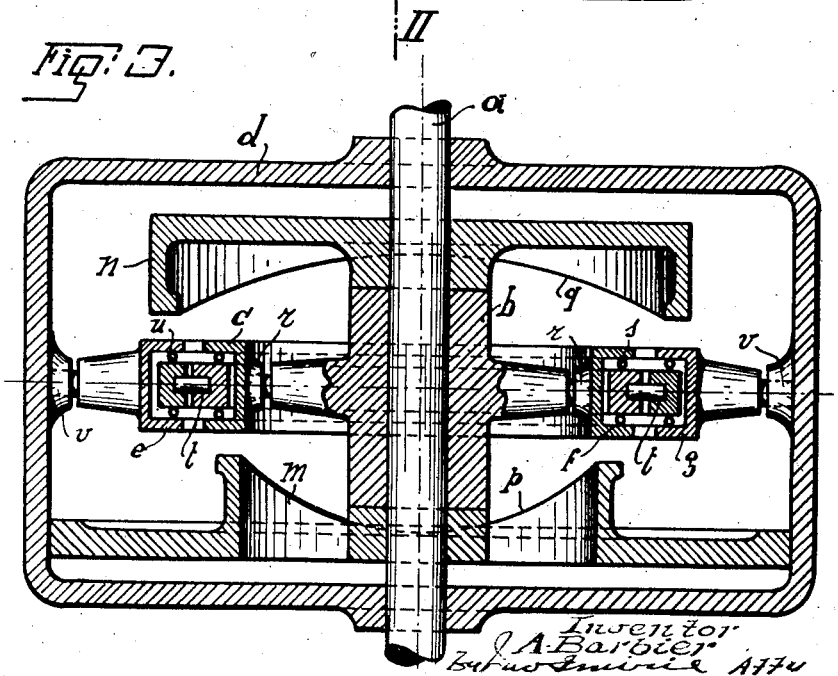
Fig. 3 is a sectional plan view taken on line III—III in Fig. 2.
Figure 2:
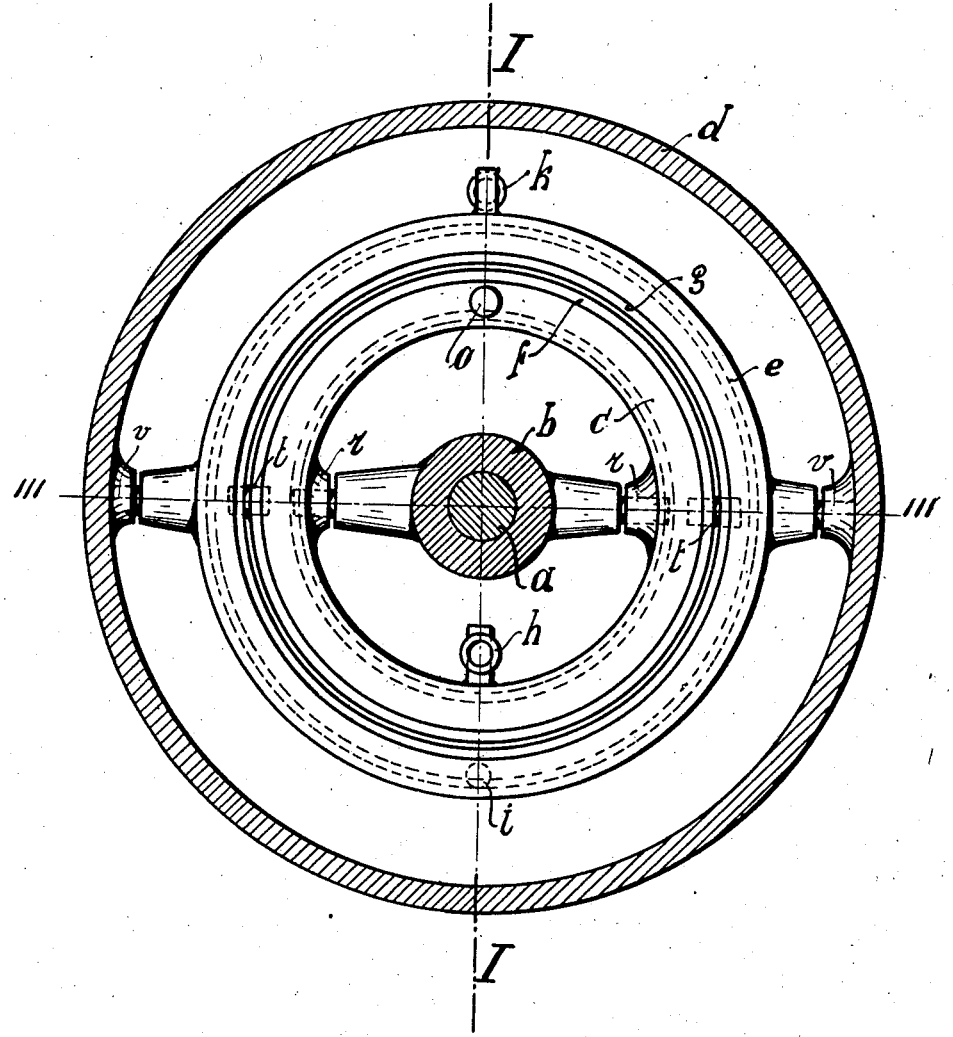
Fig. 2 is a cross section taken on line II—II in Fig. 1.

$a$ is a shaft driven by the motor, the movement of which must be transmitted at a reduced speed to a driven member supposed to be a drum $d$ having the same axis as the shaft $a$ on which it can freely rotate. The drum $d$ can be used as a driving pulley for the engine or be driven or eventually be connected to a shaft in alignment with the shaft $a$ and used as transmission shaft for the machine or member which is to be driven.

On the shaft $a$ is mounted inside the drum $d$ a sleeve $b$ carrying projecting studs $r$. A circular frame $c$ is pivoted on these studs and is provided on its periphery with a race or groove in which a ring $f$ is adapted to rotate, the rotation of the said ring being improved by ball-bearings $s$ reducing the friction beween this ring $f$ and its circular driving frame $c$. The ring $f$ is surrounded by a concentrical ring $g$ which is pivotally connected to the ring $f$ by diametral joints $t$ around which the two rings are able to pivot.

The outer ring $g$ is mounted in a circular frame $e$ having at its inner periphery a race or groove in which the ring rotates by means of ball-bearings $u$.

The circular frame $e$ is mounted by means of studs $v$ in the drum $d$ in which it can pivot in describing a sphere concentric to the sphere described by the oscillation of the circular frame $c$ around the studs $r$ of the sleeve $b$. The centers of the frames $c$ and $e$ and the centers of the rings $f$ and $g$ coincide and are on the common axis of the shaft $a$ and of the drum $d$.

Inside the drum $d$ is fixed a plate $m$ which is provided with a face $p$ suitably shaped on which slides a contacting finger $o$ provided on the circular frame $c$. This finger is held against the surface $p$ of the plate $m$ by a spring $h$ arranged between the circular frame and a projection $j$ on the sleeve $b$. A plate $n$ is fixed on the sleeve $b$ and is provided with a face $q$ of suitable shape on which slides a finger $i$ provided on the circular frame $e$.

This frame is held with the finger $i$ in contact with the surface $q$ of the plate $n$, by means of a spring $k$ which is arranged between the circular frame $e$ and a projection $l$ on the drum $d$.

By means of this construction any rotation of the drum $d$ with respect to the shaft $a$ results in an oscillation of the circular frames $c$ and $e$, these movements of oscillation being produced by the shape of the surfaces $p$ and $q$ of the plates $m$ and $n$.

In the example shown the two frames $c$ and $e$ are oscillated by means of the plates $m$ and $n$. If the frame $c$ is maintained in a fixed relation to the sleeve $b$, the frame $e$ only can oscillate; if it is the frame $e$ which is maintained in a fixed relation to the drum, the frame $c$ only will be caused to oscillate.

The apparatus just described works as follows:

The rotation of the shaft $a$ causes the circular frame $c$ to be oscillated owing to the displacement of the finger $o$ along the surface $p$ of the plate $m$. This oscillation produces reactions on the ring $f$ which begins to rotate, driving by means of the joint $t$, the ring $g$ mounted in the frame $e$ articulated on the drum $d$. The angular speed of the ring $f$ and $g$ depends at the same time on the angular speed of the shaft $a$ and on the speed of the drum $d$ and varies with the inclination of the frames $c$ and $e$. This variation of the speed of the rings produces inertia forces which are decomposed into pressures which are normal to the frames. The reaction on the frame $e$ pivotally connected to the drum $d$ produces a driving couple for this drum; these reactions vary at each moment in magnitude and in direction. It may therefore be considered that there exists between the shaft $a$ and the drum $d$ an imaginary connection resulting from the reactions on the frames $c$ and $e$ respectively.

The working of the apparatus may be compared to successive clutching and unclutching of a gear acting during very small moments, the intervals of time between the successive clutchings being fixed by the relative movement of the shaft with respect to the drum.

What I claim is:

1. In a speed reducing apparatus in combination with a driving shaft, a circular frame, means whereby the said frame is caused to rotate with the said shaft and to oscillate in planes at right angles to the said shaft, a ring freely supported by the said frame, a second ring concentric to the first ring and pivotally connected to the latter, a second frame acted upon by the said second ring, a driven member and means whereby the said member is rotated by the said second frame.

2. In a speed reducing apparatus in combination with a driving shaft, a circular frame, a sleeve mounted on this shaft whereby the said frame is caused to rotate with the said shaft and means whereby the said frame is caused to oscillate in planes at right angles to the said shaft, a ring freely supported by the said frame, a second ring concentric to the first ring and pivotally connected to the latter, a second frame acted upon by the said second ring, a driven member and means whereby the said driven member is rotated by the said second frame.

3. In a speed reducing apparatus in combination with a driving shaft, a circular frame, a sleeve mounted on the shaft, whereby the said frame is caused to rotate with the said shaft, a plate provided with a cam like face, a finger sliding in contact with this face, the said finger being provided on the circular frame whereby the said frame is caused to oscillate in planes at right angles to the said shaft a ring freely supported by the said frame, a second ring concentric to the first ring and pivotally connected to the latter, a second frame acted upon by the said second ring, a driven member and means whereby the said driven member is rotated by the said second frame.

4. In a speed reducing apparatus in combination with a driving shaft, a circular frame, a sleeve mounted on this shaft, whereby the said frame is caused to rotate with the said shaft, a plate provided with a cam like face, a finger sliding in contact with this face, the said finger being provided on the circular frame, whereby the said frame is caused to oscillate in planes at right angles to the said shaft, a ring freely supported by the said frame, a second ring concentric to the first ring and pivotally connected to the latter, a second frame acted upon by the said second ring, a driven member, a pivotal connection between the second frame and the driven member, a second plate mounted on the driving shaft, the said second plate being provided with a cam like face and a finger provided on this second frame and sliding in contact with the cam-like face of the second plate.

5. In a speed reducing apparatus in combination a driving shaft, a drum concentric to this shaft, a sleeve mounted on the shaft, a circular frame pivotally connected to the said sleeve, a ring freely supported by the said frame, a second ring jointed to the first ring, a second circular frame surrounding the said second ring, a pivotal connection between the said second circular frame and the drum, a plate mounted in the said drum and rotating with the said drum, means whereby the second frame is maintained in contact with the said plate, a second plate mounted on the driving shaft and means whereby the first frame is maintained in contact with the said second plate.

6. In a speed reducing apparatus in combination a driving shaft, a drum concentric to this shaft, a sleeve mounted on the shaft, a circular frame pivotally connected to the said sleeve, a ring freely supported by the said frame, a second ring jointed to the first ring, a second circular frame surrounding the said second ring, a pivotal connection between the said second circular frame and the drum, a plate mounted in the said drum and rotating with the said drum, a spring whereby the second frame is maintained in contact with the said plate, a second plate mounted on the driving shaft and a second spring whereby the first frame is maintained in contact with the second plate.

In testimony whereof I have affixed my signature.

ALFRED BARBIER.